Dec. 7, 1954  F. J. COZZOLI  2,696,174
FILLING MACHINE FOR PHARMACEUTICAL LIQUIDS
Filed Feb. 16, 1951  2 Sheets-Sheet 1
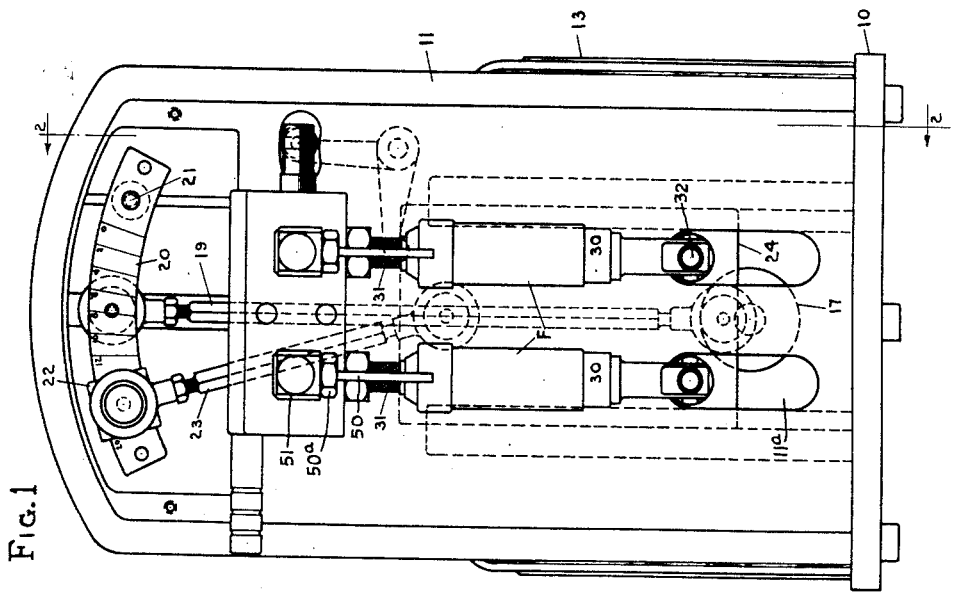
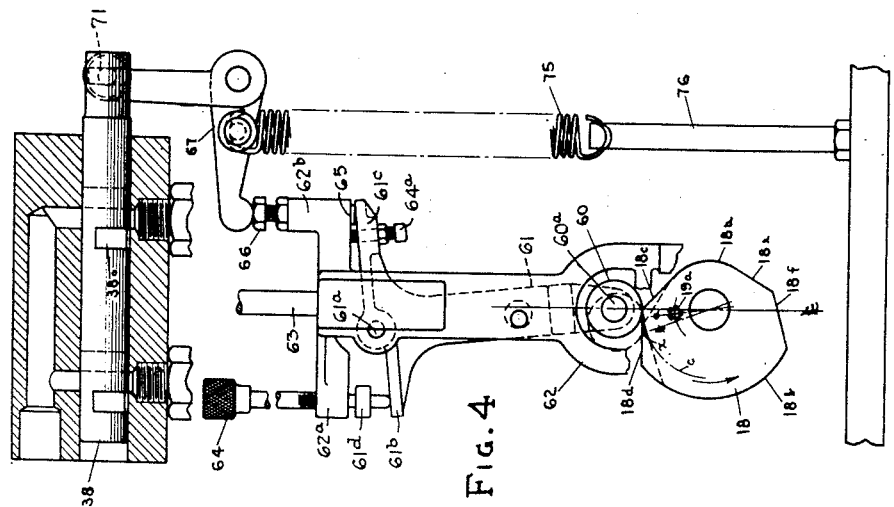
INVENTOR.
Frank J. Cozzoli
BY
Harold F. Shilman
ATTORNEY

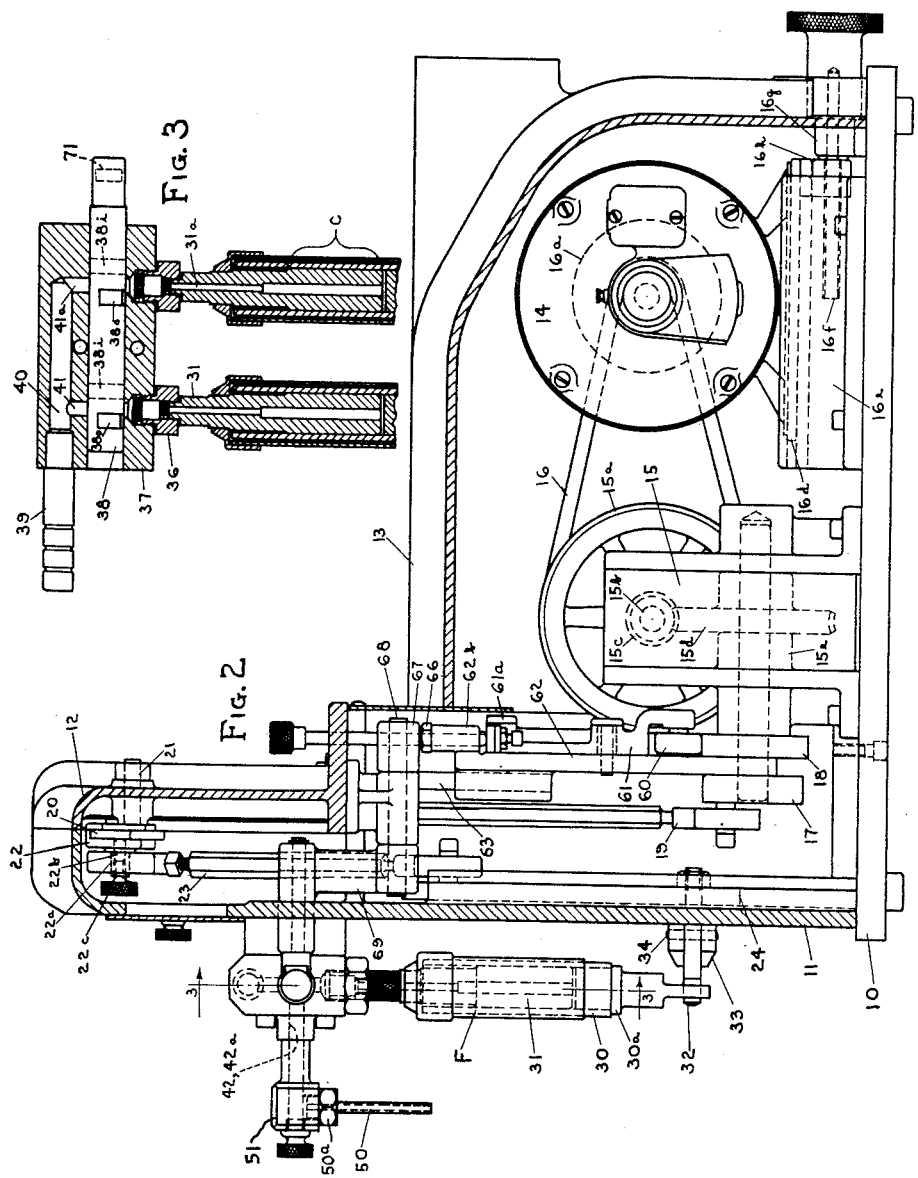

United States Patent Office 2,696,174
Patented Dec. 7, 1954

2,696,174

FILLING MACHINE FOR PHARMACEUTICAL LIQUIDS

Frank J. Cozzoli, Plainfield, N. J.

Application February 16, 1951, Serial No. 211,221

3 Claims. (Cl. 103—227)

The present invention concerns filling apparatus for use by the pharmaceutical and chemical professions, and relates more particularly to improvements in a machine particularly designed and adapted for the precise measuring of liquid preparations in exact unit dosages, free of contamination by the materials of the measuring unit, and free of the problem of leakage.

A primary aim of the invention is the construction of a mechanism capable of accurately measuring chemical preparations, in whole or fractional parts of 1 cc. rapidly and expeditiously and with assurance that each of the vials, ampuls, or other containers of the run is supplied with the correct quantity of the preparation.

A further aim of the invention is the construction of a measuring pump mechanism for a filling machine for this purpose whose volumetric displacement may be varied with ease, and which will be unerring in its measuring function throughout the range of available adjustment of quantity provided.

The construction and use of a filling machine for this special purpose involves many problems such as those having to do with the capacity for sterilization before and after using, the maintaining of a high degree of accuracy in the unit quantities dispensed, the performance of such functions over long periods without adversely affecting the product, or of causing erosion, sticking, or seizing up of closely fitted moving parts, as may occur in the measuring and dispensing of certain chemical preparations. The present invention aims to provide a practical solution to such problems in a manner that eliminates the need for packing glands of one form or another, that are likely to contaminate the medium or be adversely affected by sterilization processes.

Filling machines for pharmaceutical preparations have heretofore been constructed in such manner as to use in some instances, a glass syringe for the measuring unit, and in other instances, a piston and cylinder of stainless steel, both with the view toward using materials substantially inert to the preparation that is to be measured and dispensed. The likelihood of syringe fracture, cylinder leakage, piston and cylinder erosion, seizing, sticking, or other erratic action such as incorrect measurement of quantity, ampul stem wetting, etc. were, however, ever present in the prior constructions. With the present invention, difficulties of that nature do not arise, for it is now proposed to construct a filling machine for ampuls and vials that is constructed of relatively few parts, has a relatively wide range of delivery capacity adjustment, which embodies a non-wetting feature, which is capable of easy dismantling for sterilization purposes without danger of fracture, and a machine in which all portions contacted by the pharmaceutical medium are constructed of materials not only relatively inert to the chemical medium but relatively compatible with one another so that sticking or seizing up of relatively moving parts is avoided. In attaining the objectives, it is proposed to construct a filling machine preferably with a variable speed drive, the final element of which in the instant embodiment of the invention, is arranged to carry a crank member and a valve operating cam. The crank is connected to oscillate a lever from a zero position which corresponds with zero position of a stainless steel measuring unit, to a maximum position which corresponds to maximum delivery position of the measuring unit. The oscillatable lever in turn is operatively connected with one of the elements of the measuring unit, e. g. the cylinder, by means including a yoke that is adjustable along the lever, from its pivot point outwardly, for varying the displacement stroke. The other element of the measuring unit, e. g. the piston, is preferably detachably connected to a stainless steel control valve, the latter being operated by the above mentioned cam in synchronism with the oscillations imparted to the lever by the crank. The referred to connections are so constructed, however, that valve action may be caused to occur relatively late, by a variable amount, with relation to one end of the stroke of the measuring unit so that a portion of the liquid previously expelled from the cylinder is caused to return to the cylinder. By causing such a return flow in the discharge line, the droplet that otherwise would hang upon the needle end, is drawn back within the needle. By varying the degree of lateness, it is possible, by this invention, to control the "pullback" to the end of maintaining the quantity returned to the cylinder substantially constant over the entire range of delivery settings.

Other objects and advantages will be in part indicated in the following description and in part rendered apparent therefrom in connection with the annexed drawings.

To enable others skilled in the art so fully to apprehend the underlying features hereof that they may embody the same in various ways contemplated by this invention, drawings depicting a preferred typical construction have been annexed as a part of this disclosure and, in such drawings, like characters of reference denote corresponding parts throughout all the views, of which:

Figure 1 of the drawings is a front view of a filling machine embodying the invention.

Fig. 2 is a side view, shown in section substantially along line 2—2 of Fig. 1, of the machine.

Fig. 3 is a vertical sectional view, along line 3—3 of Fig. 2, of a preferred valve construction and portions of the piston and cylinder of the measuring unit.

Fig. 4 is a front view of portions of the drive mechanism with the parts in the position they will assume at the end of a delivery stroke when the machine is set to deliver its full capacity.

Referring more particularly to the embodiment shown in Figs. 1 and 2, the machine comprises essentially, a base member 10, an upstanding hollow front panel 11, a rear panel cover 12, and a transmission housing 13, these parts normally enclosing substantially all of the driving elements of the filling machine.

In the instant disclosure, the machine incorporates a variable speed transmission including a shiftable motor 14, a speed reducing unit 15, and a belt and pulley drive connection, indicated generally at 16, therebetween. The motor shaft is equipped with a variable pitch sheave 16a, the pitch of which is controlled by adjusting the motor toward or away from the speed reducer 15. For that purpose the motor may be suitably mounted upon a base plate 16d which in turn is mounted in two parallel guides 16e (only one shown), secured to the main base 10. An adjusting screw 16f is rotatively journaled in a block 16g carried by the main base and threadably engages a nut 16h secured to the motor base plate 16d. The speed reducing unit 15, carries a pulley 15a on its worm shaft 15b. Also mounted on the worm shaft 15b is a worm 15c that meshes with and drives a worm gear 15d mounted on a driven shaft 15e. Preferably the drive mechanism so far explained, is calculated to impart a speed to the driven shaft 15e varying from approximately 15 to 30 revolutions per minute, this range of speed being found to produce desirable filling speeds as will be later explained.

The forward end of the driven shaft 15e, is arranged to carry a crank member 17 and a valve actuating cam 18 which preferably are constructed in one piece and pinned or otherwise locked to the shaft, but may, of course, be constructed in two pieces, each being locked to the shaft in proper phase relation.

The crank member 17 is connected with one end of a connecting rod 19, preferably by means of an anti-friction bearing, and the upper end of which is similarly connected to an oscillatable lever 20, the connection being made to the lever at a point removed from the pivot and preferably intermediate its ends. The lever 20 is pivotally supported at one end by a shaft 21 journaled in bearings provided by the panel cover 12. Thus, as the crank 17 revolves, the lever 20 is caused to oscillate about its pivot continuously and through a fixed angular distance. By means of an adjustable yoke piece 22, and connecting rod 23, the arcuate motions of the lever may be transmitted to a vertically movable slide member 24 that is mounted in guides provided in the front panel 11. The connecting rod 23 is suitably secured to the yoke piece at one and to the slide at its other end, preferably by anti-friction bearings. As will appear by referring to Fig. 1, if the yoke piece 22 is clamped to the lever 20 at the latter's free end, the vertical movements imparted to the slide 24 will be maximum, whereas if the yoke piece is clamped to the lever 20 at a point coincident with the pivot axis 21, the movements imparted to the slide will be zero. If the yoke piece is clamped to the lever at any point between these extremes, the movement imparted to the slide is correspondingly altered. Preferably the yoke piece 22 is fashioned with an extension 22a, that forms a journal for the eye of the connecting rod 23. The extension is drilled and threaded to receive a clamp pin 22b and clamp screw 22c. The rear of the yoke is provided with portions that overlap the rear face of lever 20 and which are adapted to be clamped against the rear face thereof when the screw 22c is tightened.

In the position of the parts illustrated in Fig. 1, the arm 20 is in its uppermost position, and so is the slide 24, this position corresponding to the fully discharged position of the measuring unit. And so that this fully discharged position does not vary as the yoke piece is adjusted radially on the arm 20, it is preferred to construct the arm in the form of a curve, the radius of which equals the length of the connecting rod 23. As will appear from Fig. 1, movement of the yoke along the sector shaped arm 20 does not per se raise or lower the slide 24, and since the arm is always returned to a position of concentricity at the end of each stroke, the filling unit, which is actuated from the slide, is always returned to its zero or empty position.

The filling machine, in the embodiment shown, is equipped with two stainless steel filling units F, each comprising a cylinder element 30 and a piston element 31, the former being rectilinearly movable and the latter relatively stationary. The cylinder 30 is closed at one end by a head piece 30a which is constructed in the form of an eye adapted to fit over a slide carried pintle 32. The pintle 32 is pivoted on a vertical axis as at 34, in a slotted lug 33 that is securely mounted to the slide 24. Each of the lugs extends through and operates in a slot 11a formed in the front panel.

The inner wall of the cylinder is precision ground and honed to receive closely fitting piston element 31, the outer surface of which has previously been given a relatively hard coating. The purpose of the hard coating is of particular significance and importance in this environment for I have found that if both piston and cylinder of the measuring unit are constructed of stainless steel, the better to withstand chemical reaction by pharmaceutical preparations, a stainless steel piston operating in a stainless steel cylinder, with the close tolerances necessary to prevent leakage, has a tendency to pick-up and score and frequently seize. When that occurs, the accuracy of the unit is destroyed and rendered unfit for the purpose, or it becomes tightly jammed. And when a measuring plunger is suddenly locked fast in its cylinder, the excessive strain deforms cooperating parts of the drive train and the machine as a whole is rendered generally unfit and must be rebuilt. In endeavoring to overcome piston scoring, undue leakage, piston seizing, while at the same time preserving the inertness characteristic of stainless steel to pharmaceutical preparations, I have discovered that the application of a relatively thin coating of hard chromium to the surface of the piston to be a practical solution. By "hard" chromium is meant a chromium plate surface that is harder than the surface of what is commonly regarded as chromium plated. And by applying the hard chrome to the sides of the piston, its head end which is the portion in direct contact with the preparation taken in and expelled from the cylinder, remains as a stainless steel surface and retains all the essential and desirable characteristics and properties of stainless steel that are necessary in the handling of pharmaceutical and medicinal preparations.

Measuring units constructed in this manner have been found to retain their accuracy, without scoring or seizing, and without need of packing materials of any kind, for long periods of continuous use. I attribute the highly satisfactory action to some inexplainable antipathy of hard chrome to stainless steel which seems to promote frictionless operation and sufficient wetting of the engaging surfaces to prevent leakage of the medium. I am aware that ordinary chrome plating of an article for the purpose of minimizing wear or to produce a rustless finish which are the natural known properties of chrome, has been practiced heretofore. However, the objective here is neither to prevent wear, nor to protect the under metal, nor for ornamentation, but to obtain a condition between relatively movable surfaces that resists picking up, prevents leakage, and is not destructive, these requirements being of particular importance in pharmaceutical filling mechanisms.

As represented in Fig. 3, the hard chrome is applied preferably to the exterior surface of the piston 31 in the region bracketed as c, whereas the ends, shank, and central bore 31a not being in metal to metal contact with another surface may be left untreated and uncovered. The upper end of the piston of each filling unit is screw threaded and adapted to be screwed into a valve body adapter 36, or if desired directly into the valve body 37. The valve body, in the instant disclosure, is constructed to valve two filling units, is horizontally bored to receive a ported valve piston 38, a supply nipple 39 and common conduit 40, and transversely bored to provide pairs of intake passages 41, 41a, and delivery passages 42, 42a. The cooperating valve piston 38 is constructed with a pair of through ports 38i and a pair of diagonal ports 38o, the former being cylinder intake ports, and the latter cylinder outflow ports. One set of the piston ports functions with one measuring unit and the other with the other and the ports of each set are so displaced lengthwise of the valve piston that the length of the land between the "in" and "out" ports substantially equals the width of the supply port 41 (or 41a) so that there is no appreciable lap when the valve piston is in a mid position. The supply port 41 (or 41a) communicates at one side of the valve piston with the common supply, and at the other side of the valve piston with the interior of its associated measuring unit. The preferred construction of this type of valve follows that of the piston and cylinder of the measuring unit, that is the valve body 37 and valve piston 38 are constructed of chemically inert materials, such as stainless steel, and the exterior of the surface of the valve piston is given a coating of hard chrome to the end of obtaining frictionless surface engagement, of avoiding pick-up, sticking, or seizing, and of obtaining a leakless jointing of movable parts without need of supplementary packing, and retaining stainless steel exposures to the fluid mediums that pass through the valve.

When the valve piston is shifted to the left from the position shown in Fig. 3, the respective measuring units are brought into communication with the common supply port 40; when the piston is moved to the extreme right position, the interior of the measuring units are in communication with delivery ports 42, 42a, the latter in turn being constantly in communication with filling needles 50. Also, to avoid product contamination, each needle is constructed of stainless steel, with a stainless steel hub 50a that screw threads into a delivery nipple 51 aligned with delivery port 42 (or 42a) in the valve body.

Operation of the valve piston from one extreme position to the other is made to correspond, in general, substantially coincidently with the reversals in the reciprocatory movements imparted to the cylinder 30, so that a measured quantity from the supply 40 is taken into the cylinder and subsequently discharged therefrom, via the valve, through the filling needle and into the ampul or vial (not shown) held in filling relation therewith.

The valve cam 18 is provided from this purpose and is constructed with low portion 18a, and a high portion 18b, and intermediate connecting portions 18c, 18d, and 18e and 18f. A cam follower 60 is provided to track on the cam and to respond thereto, in a vertical direction, as the cam revolves. The follower 60 is rotatably mounted, as at 60a, to the lower end of a lever 61. Lever 61 is pivoted at its upper end, as at 61a, to a valve shifter yoke 62. The lower end of the yoke is bifurcated and straddles an annular groove formed in the cam member 18. The upper end of the yoke is provided with a guide extension 63 that is slidable in a bearing provided in the cover member 12. As illustrated in Fig. 2, the general plane of the yoke member 62 extends perpendicular to the axis of the cam shaft 15e, and the pivotal axis of lever 61 is parallel with that shaft so that the follower 60, at the free end of the lever, has a lateral movement also in a plane perpendicular to the axis of the shaft 51e, the reason for which will later be explained. As illustrated in Fig. 4, it is preferred to permit the follower 60 to move laterally from a position substantially on a vertical center line to a position entirely to one side thereof, this movement being under the control of a threaded adjusting screw 64, and a spring loaded pin 65 operating on the lever at opposite sides of the pivot 61a. Supporting means for the screw and pin are provided in this instance, by extending arms 62a and 62b formed on the yoke member 62, the former being screw threaded to receive adjusting screw 64, and the latter being bored to receive pin 65. Cooperating arms 61b and 61c are provided on lever 61 at opposite sides of the pivot 61a. As the adjusting screw 64 is advanced, the follower 60, carried by the lever 61 is urged toward a position on the center line and as the screw is retracted the spring loaded pin 65 urges the follower away from the centerline. Adjustable stops 61d and 64a are provided to limit the extremes of shift of the follower. Inasmuch as the follower 60 moves in an arcuate path about the pivot point 61a, it is preferred to locate the pivot 61a some distance to one side of the vertical centerline (Fig. 4) so that the follower moves downward as it is shifted away from the centerline position.

The arm 62b is also formed with an extension, preferably in the form of an adjustable abutment 66 positioned as to engage the free end of a valve shifting lever 67. Lever 67 is pivoted, as at 68, to the main frame of the machine and is integral with another lever 69 disposed at approximately 90° thereto. The free end of the lever 69 is operatively connected with the valve plunger 38, preferably as by a swivel key 70 carried by the lever and a cooperating slot 71 in the side of the valve plunger.

As the cam 18 is rotated, the follower 60 is caused to raise and lower in response to the rise and fall of the surface of the cam, these movements producing a horizontal movement of the valve plunger from one extreme position to the other. Valve movements are, in general, caused to occur in synchronism with the changes in stroke of the measuring pump elements 30 and 31 so that on an intake stroke of the measuring unit, the cylinders are connected with the supply manifold 40, and on a delivery stroke the cylinders are connected with the filling needles 50. Adjustment of the connecting rod yoke 22 along the sector arm 20 varies the quantity taken in and expelled from the filling unit, but neither its timing with relation to valve movement nor its capability to discharge its full contents on each cycle irrespective of its capacity setting, is altered.

In furtherance of the objective to maintain the product free from contaminating effects of the materials entering the construction and in intimate contact with the product as well as from the surrounding atmosphere, this invention proposes a filling machine construction in which the droplet that normally tends to form at the end of the filling needle on completion of a delivery stroke is effectively eliminated so there is no appreciable exposure of the preparation to atmosphere. This latter result is achieved in the instant embodiment of the invention by delaying the shifting of the valve at the end of the delivery stroke until after the intake stroke has started. A slight delay in valve shift at this point has the effect of keeping the discharge port 38o in communication with the cylinder and on the intake stroke fluid is drawn from the passages leading to the needle and the fluid at the needle end is drawn back.

Inherent in a filling machine construction of the character described, is the fact that a predetermined fixed "lateness" in valve shifting will cause a pull back of the predetermined percentage of the quantity for which the filling unit is set to deliver. That is, on a 1 cc. stroke setting, the pull back may, for illustration, be 2 percent of 1 cc. or .02 cc., this volume being sufficient to cause the fluid entrained in the needle to recede, let it be assumed, one-half inch from its discharge end. When, however, the stroke is set to deliver 10 cc. the pull back will be 10 times as great and the possibility of air being drawn into the measuring unit presents itself. To prevent such occurrences, it is proposed to maintain the pull-back quantity substantially constant over the entire range of stroke adjustment, to the end of obtaining, for instance, a one-half inch pull-back on maximum stroke settings as well as a one-half inch pull-back on minimum stroke settings. To effectuate this result, the follower roll 60 is advanced circumferentially of the cam 18 a greater or lesser degree relative to the position of the connecting rod crank pin 19a, in accordance with the position yoke piece 22 occupies on the sector arm 20 which determines the stroke and delivery quantity.

With reference to Fig. 4, the valve cam 18 is constructed with a low dwell portion 18a, and a high dwell portion 18b disposed at opposite sides of the vertical centerline. The crank pin 19a is indicated in a position approximately 7° past the centerline, this position, indicating that the delivery stroke of the unit (up-stroke) has been completed and the intake stroke (down-stroke) has commenced. The rise of the arc consequent in the exemplified 7° movement of the crank off zero or dead center, is a function of the amount the cylinder of the filling unit is expanded. It will also be observed that the follower roll 60 now occupies a position on the vertical centerline at a half-way point in its vertical movement. This half-way point corresponds with the intermediate and closed off position of the valve 38 as indicated at the upper portion of Fig. 4. It follows that during the last part of the up-stroke of the crank 19a, the follower 60 follows down the cam face 18d but does not reach the half-way point until after the crank starts its down-stroke, and consequently the port 38o in valve plunger 38 remains connected with the cylinder during the aforementioned 7° movement of the crank. Thus, for a portion of the suction stroke, the cylinder obtains fluid from the delivery conduit and the needle 50 and a pull-back of the final drop is achieved.

If the sector arm yoke 22 be set closer to the pivot 21 of the sector arm 20, it becomes necessary to retard valve movement still more and this is accomplished by backing off adjusting screw 64 so that the follower 60 operates to one side of the vertical centerline. When so positioned, see dotted line positions indicated in Fig. 4, the crank pin 19a will have moved to a position b before the follower 60 drops to the half-way point (line c) and closes the valve. Accordingly, the valve delivery port 38o remains connected with the cylinder longer than before but no longer than necessary to effectuate the desired pull-back at the needle, having regard to the fact that the filling unit will be operating on a smaller delivery setting (shorter stroke) and the pull-back, in terms of percentage, must be greater. In this connection, the apparent drop of the follower from its center line position (full-lines), and its off the centerline position (dotted lines) indicated at x in Fig. 4, is not an actual drop because the pivot point 61a is positioned off-center and causes the follower 60 to move in a direction that will place it at the intersection of cam faces 18d and 18c at the time it should be, without adversely effecting its relation or connections with the valve plunger 38.

The follower 60 is caused to track the surface of the cam 18, preferably by means of tension spring 75 anchored at one end to a base mounted adjustable anchor post 76 and its other end to a valve lever 67 to one side of its pivot. The spring maintains a semi-positive connection between the valve lever and the operating yoke 62 and affords convenient means for permitting adjustment to be made, by screw 66, to compensate for wear or to bring the valve piston in proper position relative to the ports in the valve body in relation to the action imparted by the cam 18.

The opposite side of the cam 18, faces 18e and 18f, come into action to effect shifting of the valve from intake to delivery at the end of the suction stroke of the filling unit. The timing of the shift at this end of the cycle is important, though not as critical as the timing at the end of the delivery, and I have found that by constructing the cam so that the intersection of curves 18e and 18f occupies a position slightly ahead of the diametrical line passing through the crank pin 19a, by an amount that is approximately half the distance follower 60 is capable of being circumferentially shifted relative to the cam, that exceptionally accurate measurement and pumping action by the filling unit is attained.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A filling unit for accurately measuring and dispensing unit quantities of pharmaceutical preparations free of contamination with the ports, passageways and chambers within the unit comprising a body member consisting solely of stainless steel metal, said body member having a cylindrical valve bore formed therein adapted to receive a movable valve element, a movable stainless steel valve element closely fitting said bore so as to provide a leakless joint therebetween, said body member having a supply passageway formed therein communicating with said valve bore and a cylinder passageway communicating with said valve bore and a delivery passageway communicating with said valve bore, said passageways being spaced from one another, and said valve element having a pair of flow passageways formed therein extending transverse the axis and spaced from one another longitudinally adapted when the valve is in one extreme position of movement to establish communication between said supply passageway and the cylinder passageway and when in opposite extreme position of movement to close off said supply passageway and to establish communication between the cylinder passageway and the delivery passageway, and a measuring piston and cylinder assembly connected with said cylinder passageway in the body member, said measuring assembly consisting of a stainless steel cylinder element and a coacting stainless steel piston element closely fitting the bore of the said cylinder element as to provide a leakless metal-on-metal joint therebetween, and said piston element having a hard chromed exterior resistant to pharmaceutical preparations and antipathetic to the cooperating surface of the cylinder element effective to prevent seizing of the closely fitting and relatively movable components.

2. A filling unit for accurately measuring and dispensing unit quantities of pharmaceutical preparations free of contamination by contact with the ports, passageways and chambers within the unit comprising a body member consisting solely of stainless steel metal, said body member having a cylindrical valve bore formed therein adapted to receive a movable valve element, a movable stainless steel valve element closely fitting said bore so as to provide leakless joint therebetween, said body member having a supply passageway formed therein communicating with said valve bore and a cylinder passageway communicating with said valve bore and a delivery passageway communicating with said valve bore, said passageways being spaced from one another and said valve element having a pair of flow passageways formed therein extending transverse the axis and spaced from one another longitudinally adapted when the valve is in one extreme position of movement to establish communication between said supply passageway and the cylinder passageway and when in an opposite extreme position to close off said supply passageway and to establish communication between the cylinder passageway and the delivery passageway, and a measuring piston and cylinder assembly connected with said cylinder passageway in the body member, said measuring assembly consisting of a stainless steel cylinder element and a coacting stainless steel piston element closely fitting the bore of the cylinder element as to provide a leakless metal-on-metal joint therebetween, and said valve element having a hard chromed exterior resistant to pharmaceutical preparations and antipathetic to the cooperating surface of the valve bore in the body member effective to prevent seizing of the closely fitting and relatively movable valve element.

3. The filling unit combination of claim 1 in which the said valve element is also provided with a hard chromed exterior resistant to pharmaceutical preparations and antipathetic to the cooperating surface of the valve bore in the body member effective to prevent seizing of the closely fitting and relatively movable valve element.

References Cited in the file of this patent

UNITED STATES PATENTS

| Number | Name | Date |
|---|---|---|
| 814,491 | Wisterman | Mar. 6, 1906 |
| 1,238,670 | Holbrook | Aug. 28, 1917 |
| 1,382,336 | Behr | June 21, 1921 |
| 1,389,548 | Eger | Aug. 20, 1921 |
| 1,449,541 | O'Brien | Mar. 27, 1923 |
| 1,943,491 | Sieper | Jan. 16, 1934 |
| 2,006,879 | Benedek | July 2, 1935 |
| 2,220,821 | Mancuso | Nov. 5, 1940 |
| 2,308,974 | Harper | Jan. 19, 1943 |
| 2,348,958 | Celio | May 16, 1944 |
| 2,496,547 | Lankford | Feb. 7, 1950 |